(12) United States Patent
Cui et al.

(10) Patent No.: US 12,230,762 B2
(45) Date of Patent: Feb. 18, 2025

(54) ELECTROCHEMICAL APPARATUS AND ELECTRONIC APPARATUS CONTAINING SAME

(71) Applicant: Ningde Amperex Technology Limited, Fujian (CN)

(72) Inventors: Hui Cui, Fujian (CN); Jianming Zheng, Fujian (CN); Xiang Wang, Fujian (CN); Mingming Guan, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 996 days.

(21) Appl. No.: 17/281,545

(22) PCT Filed: Mar. 31, 2020

(86) PCT No.: PCT/CN2020/082435
§ 371 (c)(1),
(2) Date: Mar. 30, 2021

(87) PCT Pub. No.: WO2021/195965
PCT Pub. Date: Oct. 7, 2021

(65) Prior Publication Data
US 2022/0123365 A1    Apr. 21, 2022

(51) Int. Cl.
*H01M 10/0569* (2010.01)
*H01M 10/0525* (2010.01)
*H01M 10/0567* (2010.01)

(52) U.S. Cl.
CPC ... *H01M 10/0569* (2013.01); *H01M 10/0525* (2013.01); *H01M 2220/30* (2013.01); *H01M 2300/0034* (2013.01)

(58) Field of Classification Search
CPC ......... H01M 10/0567; H01M 10/0569; H01M 2004/027; H01M 10/0568; H01M 2004/021
See application file for complete search history.

(56) References Cited

U.S. PATENT DOCUMENTS

| 2011/0183217 A1* | 7/2011 | Takahashi | H01M 4/525 429/338 |
| 2016/0240843 A1 | 8/2016 | Kamo et al. | |

(Continued)

FOREIGN PATENT DOCUMENTS

| CN | 101030659 | 9/2007 |
| CN | 103884995 | 6/2014 |

(Continued)

OTHER PUBLICATIONS

Cui, Hui; International Search Report for PCT Application No. PCT/CN/2020/082435, filed Mar. 31, 2020, mailedDec. 28, 2020, 5 pages.

(Continued)

*Primary Examiner* — Imran Akram
(74) *Attorney, Agent, or Firm* — Maier & Maier, PLLC

(57) ABSTRACT

An electrochemical apparatus includes an electrolyte, a positive electrode and a negative electrode, the negative electrode includes a negative active material layer, the negative active material layer includes a negative active material, the electrolyte includes fluoroethylene carbonate, and the electrochemical apparatus satisfies the following relational expressions: $0.5 < R_{ct}/R_{cp} < 1.5$ and both $R_{ct}$ and $R_{cp}$ are less than 35 milliohms, and $0.005 \leq A/B \leq 0.1$; where $R_{ct}$ represents a charge transfer resistance under 50% state of charge at 25 degrees Celsius, and $R_{cp}$ represents a concentration polarization resistance in the 50% state of charge at 25 degrees Celsius; a mass of the fluoroethylene carbonate corresponding to 1 g of the negative active material is A g, (Continued)

and a specific surface area of the negative active material is B $m^2/g$. This application aims to improve the fast charging performance of the electrochemical apparatus while maintaining the cycle performance thereof.

16 Claims, 3 Drawing Sheets

(56) References Cited

U.S. PATENT DOCUMENTS

| | | | |
|---|---|---|---|
| 2016/0276708 A1* | 9/2016 | Kawasoe | H01M 10/0567 |
| 2017/0069934 A1 | 3/2017 | Kim et al. | |
| 2018/0191027 A1* | 7/2018 | Ohara | H01M 10/0525 |
| 2018/0358610 A1* | 12/2018 | Shimanuki | H01M 4/622 |
| 2019/0326593 A1 | 10/2019 | Ozkan et al. | |
| 2021/0408596 A1* | 12/2021 | Cui | H01M 10/0567 |

FOREIGN PATENT DOCUMENTS

| | | |
|---|---|---|
| CN | 105428712 | 3/2016 |
| CN | 105742738 | 7/2016 |
| CN | 105990599 | 10/2016 |
| CN | 106207258 | 12/2016 |
| CN | 106602131 | 4/2017 |
| CN | 107851832 | 3/2018 |
| CN | 109994790 | 7/2019 |
| CN | 110165295 | 8/2019 |
| CN | 110492177 | 11/2019 |
| CN | 110501655 | 11/2019 |
| JP | 2016166857 | 9/2016 |
| WO | 2013126888 | 8/2013 |

OTHER PUBLICATIONS

Cui, Hui; Office Action for Chinese Application No. 202010243449.6, filed Mar. 31, 2020, mailed Feb. 20, 2021, 7 pages.

* cited by examiner

ELECTROCHEMICAL APPARATUS AND ELECTRONIC APPARATUS CONTAINING SAME

CROSS REFERENCE TO RELATED APPLICATIONS

The present application is a U.S. National Phase entry under 35 U.S.C. 371 of PCT international application: PCT/CN2020/082435, filed on 31 Mar. 2020, the disclosure of which is hereby incorporated by reference in its entirety.

TECHNICAL FIELD

This application relates to the technical field of energy storage, and in particular, to an electrochemical apparatus and an electronic apparatus containing the electrochemical apparatus.

BACKGROUND

Electrochemical apparatuses (for example, lithium-ion batteries) have advantages such as high energy density, long cycle life and no memory effect, and have been widely used in the fields of wearable devices, smart phones, unmanned aerial vehicles, and even electric vehicles. With the expansion of application of lithium-ion batteries and the development of information technology, higher performance requirements have been raised for the lithium-ion batteries, that is, fast charging and discharging and excellent cycle performance.

Studies on the existing fast charging and discharging technologies usually only improve a material (graphite or optimized electrolyte) or focus on only the resistance of a lithium-ion battery, without in-depth studies on the whole system. As a result, the charging speed cannot be greatly improved, and other performance, such as cycle performance, have to be compromised in pursuit of fast charging and discharging performance.

SUMMARY

Starting from an electrochemical apparatus system, this application not only considers resistance influencing the fast charging and discharging performance, but also considers a relationship between a solvent of an electrolyte and a film-forming additive of the electrolyte, considers factors such as a negative active material and a separator influencing the fast charging and discharging performance, and optimizes the relationship between the characteristics of the negative active material itself and the amount of the film-forming additive of the electrolyte, thereby optimizing the whole electrochemical apparatus system. This application aims to improve the fast charging performance of an electrochemical apparatus while maintaining the cycle performance thereof.

In some embodiments, this application provides an electrochemical apparatus, which includes an electrolyte, a positive electrode, and a negative electrode, the negative electrode includes a negative active material layer, the negative active material layer includes a negative active material, the electrolyte includes fluoroethylene carbonate, and, $0.5 < R_{ct}/R_{cp} < 1.5$, and both $R_{ct}$ and $R_{cp}$ are less than 35 milliohms, where $R_{ct}$ represents a charge transfer resistance under 50% state of charge at 25 degrees Celsius, and $R_{cp}$ represents a concentration polarization resistance in the 50% state of charge at 25 degrees Celsius; and $0.005 \leq A/B \leq 0.1$, where a mass of the fluoroethylene carbonate corresponding to 1 g of the negative active material is A g, and a specific surface area of the negative active material is B m²/g.

In some embodiments, the value of A ranges from 0.01 to 0.1, and the value of B ranges from 1.0 to 2.0.

In some embodiments, the electrolyte includes a compound of formula I:

formula I where $R_{11}$ is selected from hydrogen, a hydroxy group, a $C_{1-20}$ alkyl group, a $C_{1-20}$ alkoxy group, a $C_{2-20}$ alkenyl group, a $C_{6-30}$ aryl group, or a $C_{6-30}$ aryloxy group; $R_{12}$ is selected from hydrogen, a $C_{1-20}$ alkyl group, a $C_{2-20}$ alkenyl group, or a $C_{6-30}$ aryl group; and where a mass of the compound of formula I corresponding to 1 g of the negative active material is X g, and the value of X ranges from 0.035 to 0.39.

In some embodiments, $0.67 \leq X/A \leq 20$.

In some embodiments, the compound of formula I includes at least one of the following compounds: methyl acetate, ethyl acetate, propyl acetate, methyl propionate, ethyl propionate, n-propyl propionate, isopropyl propionate, n-butyl propionate, isobutyl propionate, n-amyl propionate, isoamyl propionate, ethyl butyrate, n-propyl butyrate, propyl isobutyrate, n-pentyl butyrate, n-pentyl isobutyrate, n-butyl butyrate, isobutyl isobutyrate, or n-pentyl valerate.

In some embodiments, X and $0.1 \leq X/P \leq 3$, where the value of P is a porosity of the negative active material layer and P ranges from 0.13 to 0.35.

In some embodiments, the electrolyte further includes vinylene carbonate, a mass of the vinylene carbonate corresponding to 1 g of the negative active material is C g, and $0.001 \leq C/B \leq 0.03$.

In some embodiments, the compound of formula I includes ethyl propionate, a mass of the ethyl propionate corresponding to 1 g of the negative active material is D g, and $1 \leq D/C \leq 240$.

In some embodiments, the electrolyte further includes at least one of a compound of formula II or a compound of formula III:

formula II

formula III where $R_{21}$ and $R_{22}$ are each independently selected from a $C_{1-5}$ alkyl group that is unsubstituted or substituted with fluorine, and at least one of $R_{21}$ and $R_{22}$ contains fluorine;

$R_{31}$ and $R_{32}$ are each independently selected from a $C_{1-20}$ alkyl group that is unsubstituted or substituted with fluorine, at least one of $R_{31}$ and $R_{32}$ contains fluorine, and Y is selected from —O— or

In some embodiments, a mass of the compound of formula II corresponding to 1 g of the negative active material is 0.015 g to 0.15 g.

In some embodiments, a mass of the compound of formula III corresponding to 1 g of the negative active material is 0.015 g to 0.065 g.

In some embodiments, the compound of formula II includes at least one of the following compounds: methyl difluoroacetate, ethyl difluoroacetate, propyl difluoroacetate, methyl difluoropropionate, ethyl difluoropropionate, propyl difluoropropionate, methyl fluoroacetate, ethyl fluoroacetate, propyl fluoroacetate, methyl trifluoroacetate, ethyl trifluoroacetate, or propyl trifluoroacetate; and the compound of formula III includes at least one of the following compounds: 1,1,2,2-tetrafluoroethyl-2,2,2-trifluoroethyl ether, or perfluoro(2-methyl-3-pentanone).

Another aspect of this application provides an electronic apparatus, and the electronic apparatus includes the electrochemical apparatus described above.

This application aims to improve the fast charging performance of the electrochemical apparatus while maintaining the cycle performance thereof. Additional aspects and advantages of the embodiments of the application are partially described and presented in the later description, or explained by implementation of the embodiments of the application.

DESCRIPTION OF EMBODIMENTS

Figure 1:
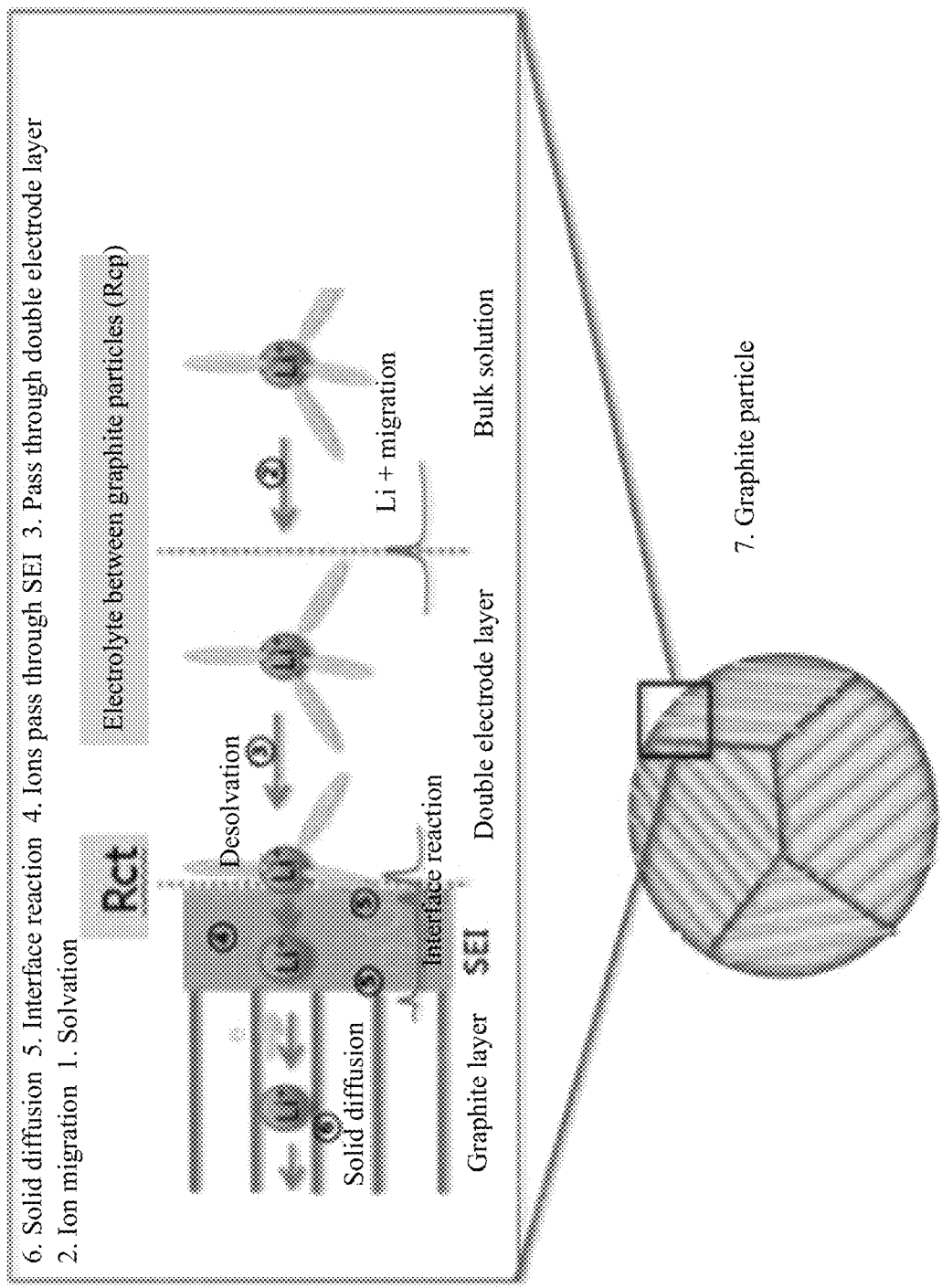
FIG. 1 illustrates $R_{ct}$ and $R_{cp}$ during transport of a lithium-ion battery.

Embodiments of this application will be described in detail below. The embodiments of this application shall not be construed as a limitation on the protection scope claimed by this application. Unless otherwise specified, the following terms used herein have the meanings indicated below.

The term "approximately" used herein are intended to describe and represent small variations. When used in combination with an event or a circumstance, the term may refer to an example in which the exact event or circumstance occurs or an example in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range were clearly designated.

In the description of embodiments and claims, a list of items preceded by the term "one of" may mean any one of the listed items. For example, if items A and B are listed, the phrase "one of A and B" means only A or only B. In another example, if items A, B, and C are listed, the phrase "one of A, B, and C" means only A, only B, or only C. The item A may contain one element or a plurality of elements. The item B may contain one element or a plurality of elements. The item C may contain one element or a plurality of elements.

In the description of embodiments and claims, a list of items preceded by the terms such as "at least one of", "at least one type of" or other similar terms may mean any combination of the listed items. For example, if items A and B are listed, the phrase "at least one of A and B" or "at least one of A or B" means only A, only B, or A and B. In another example, if items A, B, and C are listed, the phrase "at least one of A, B, and C" or "at least one of A, B, or C" means only A, only B, only C, A and B (excluding C), A and C (excluding B), B and C (excluding A), or all of A, B, and C. The item A may contain one element or a plurality of elements. The item B may contain one element or a plurality of elements. The item C may contain one element or a plurality of elements.

In the description of embodiments and claims, the carbon number, namely, the number following the capital letter "C", for example, "1", "3" or "10" in "$C_1$-$C_{10}$" and "$C_3$-$C_{10}$", represents the number of carbon atoms in a specific functional group. That is, the functional groups may include 1 to 10 carbon atoms and 3 to 10 carbon atoms, respectively. For example, "$C_1$-$C_4$ alkyl group" or "$C_{1-4}$ alkyl group" refers to an alkyl group having 1 to 4 carbon atoms, for example, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— or $(CH_3)_3C$—.

The term "alkyl group" is intended to be a straight-chain saturated hydrocarbon structure having 1 to 20, 1 to 18, 1 to 16, 1 to 14, 1 to 12, 1 to 10, 1 to 8, 1 to 6, 1 to 4, or 3 to 5 carbon atoms. The term "alkyl group" is also intended to be a branched or cyclic hydrocarbon structure having 3 to 20, 3 to 18, 3 to 16, 3 to 14, 3 to 12, 3 to 10, 3 to 8, 3 to 6, or 3 to 5 carbon atoms. References to an alkyl group with a specific carbon number are intended to cover all geometric isomers with the specific carbon number. Therefore, for example, "butyl" is meant to include n-butyl, sec-butyl, isobutyl, tert-butyl, and cyclobutyl; and "propyl" includes n-propyl, isopropyl, and cyclopropyl. Examples of alkyl groups include, but are not limited to, methyl, ethyl, n-propyl, isopropyl, cyclopropyl, n-butyl, isobutyl, sec-butyl, tert-butyl, cyclobutyl, n-pentyl, isopentyl, neopentyl, cyclopentyl, methylcyclopentyl, ethylcyclopentyl, n-hexyl, isohexyl, cyclohexyl, n-heptyl, octyl, cyclopropyl, cyclobutyl, norbornyl, and the like. In addition, the alkyl group may be arbitrarily substituted.

The term "alkenyl group" refers to a straight-chain or branched monovalent unsaturated hydrocarbon group having at least one and usually 1, 2, or 3 carbon-carbon double bonds. Unless otherwise defined, the alkenyl groups often contain 2 to 20, 2 to 18, 2 to 16, 2 to 14, 2 to 12, 2 to 10, 2 to 8, 2 to 6, or 2 to 4 carbon atoms and include, for example, —$C_{2-4}$ alkenyl, —$C_{2-6}$ alkenyl, and —$C_{2-10}$ alkenyl. Representative alkenyl groups include, for example, vinyl, n-propenyl, isopropenyl, n-but-2-enyl, but-3-enyl, and n-hex-3-enyl. In addition, the alkenyl group may be arbitrarily substituted.

The term "aryl group" covers monocyclic and polycyclic systems. Polycycles may have two or more rings in which two carbons are shared by two adjoining rings (the rings are "fused"), at least one of the rings is aromatic, for example, the other rings may be cycloalkyl, cycloalkenyl, aryl, heterocycle and/or heteroaryl. For example, the aryl group may be an aryl group having 6 to 30 carbon atoms, an aryl group having 6 to 24 carbon atoms, an aryl group having 6 to 20 carbon atoms, an aryl group having 6 to 16 carbon atoms, an aryl group having 6 to 12 carbon atoms, or an aryl group having 6 to 10 carbon atoms. Representative aryl groups include, for example, phenyl, methylphenyl, propylphenyl, isopropylphenyl, benzyl, naphth-1-yl, and naphth-2-yl. In addition, the aryl group may be arbitrarily substituted.

The term "aryloxy group" refers to an "—O-aryl" group, and the aryl is as defined herein.

The term "alkoxy group" refers to an "—O-alkyl" group, and the alkyl is as defined herein.

When the foregoing substituents are substituted, unless otherwise specified, they are substituted with one or more halogen atoms.

As used herein, the term "halogen" covers fluorine (F), chlorine (Cl), bromine (Br), and iodine (I), and is preferably F or Cl.

Electrochemical Apparatus

The electrochemical apparatus according to this application includes any apparatus in which an electrochemical reaction takes place. Specific examples of the apparatus include all kinds of primary batteries, secondary batteries, fuel batteries, solar batteries, or capacitors. Especially, the electrochemical apparatus is a lithium secondary battery, including a lithium metal secondary battery, a lithium-ion secondary battery, a lithium polymer secondary battery, or a lithium-ion polymer secondary battery. In some embodiments, the electrochemical apparatus according to this application is an electrochemical apparatus provided with a positive electrode having a positive active material capable of occluding and releasing metal ions, and a negative electrode having a negative active material capable of occluding and releasing metal ions.

In some embodiments, this application provides an electrochemical apparatus, which includes an electrolyte, a positive electrode, and a negative electrode, the negative electrode includes a negative active material layer, the negative active material layer includes a negative active material, the electrolyte includes fluoroethylene carbonate, and the electrochemical apparatus satisfies a relational expression:

$0.5 < R_{ct}/R_{cp} < 1.5$, and both $R_{ct}$ and $R_{cp}$ are less than 35 milliohms, where $R_{ct}$ represents a charge transfer resistance under 50% state of charge at degrees Celsius, and $R_{cp}$ represents a concentration polarization resistance in the 50% state of charge at 25 degrees Celsius; and $0.005 \le A/B \le 0.1$ a mass of the fluoroethylene carbonate corresponding to 1 g of the negative active material is A g, and a specific surface area of the negative active material is B m$^2$/g.

As has been found by the inventors, when $R_{ct}/R_{cp}$ is in the range of $0.5 < R_{ct}/R_{cp} < 1.5$ and both $R_{ct}$ and $R_{cp}$ are less than 35 milliohms (mΩ), lithium ions can rapidly enter the negative active material layer through a solid electrolyte interface (SEI), and the diffusion of the lithium ions in the negative active material layer is also fast, so that the ultra-large rate charging of the lithium-ion battery can be realized.

When $R_{cp}$ is far greater than $R_{ct}$, the concentration polarization of the electrolyte diffusing in the negative active material layer becomes a limiting factor for the large-rate charging of the lithium-ion battery, and even if the $R_{ct}$ is very small, the large-rate charging of the lithium-ion battery cannot be realized because the electrolyte cannot diffuse to the surface of the negative active material;

When $R_{ct}$ is far greater than $R_{cp}$, the charge transfer of the lithium ions on the surface of negative active material becomes a limiting factor. Even if $R_{cp}$ is very small, although the lithium ions can reach the surface of the negative active material fast, the intercalation in the negative active material cannot be completed fast. As a result, the lithium ions are deposited on the surface of the negative active material layer, lithium plating occurs under the high-rate charging, the low-temperature performance of the lithium-ion battery is limited, and the lithium-ion battery cannot have excellent fast charging performance.

When both $R_{ct}$ and $R_{cp}$ are more than 35 milliohms, the diffusion and charge transfer processes of the lithium ions are limited, and the fast charging performance cannot be achieved.

When the mass of the fluoroethylene carbonate and the specific surface area of the negative active material satisfy the above relationship, the diffusion of the electrolyte and the transport of lithium ions can be further ensured, and the fast charging and discharging of the lithium-ion battery can be realized.

In FIG. 1, $R_{ct}$ and $R_{cp}$ during transport of the lithium-ion battery are decomposed.

In some embodiments, the ratio $R_{ct}/R_{cp}$ of $R_{ct}$ to $R_{cp}$ ranges from 0.7 to 1.2. In some embodiments, the value of $R_{ct}/R_{cp}$ is about 0.55, about 0.6, about 0.65, about 0.7, about 0.75, about 0.8, about 0.85, about 0.9, about 0.95, about 1.0, about 1.05, about 1.1, about 1.15, about 1.2, about 1.25, about 1.3, about 1.35, about 1.4, or about 1.45. In some embodiments, the value of $R_{ct}/R_{cp}$ is about 0.54, about 0.71, about 0.92, about 1.03, about 1.15, about 1.23, about 1.37, or about 1.47.

In some embodiments, the ratio A/B of A to B ranges from 0.005 to 0.07. In some embodiments, the value of A/B is about 0.005, about 0.006, about 0.007, about 0.008, about 0.009, about 0.01, about 0.012, about 0.014, about 0.016, about 0.018, about 0.02, about 0.022, about 0.024, about 0.026, about 0.028, about 0.03, about 0.032, about 0.034, about 0.036, about 0.038, about 0.04, about 0.042, about 0.044, about 0.046, about 0.048, about 0.05, about 0.052, about 0.054, about 0.056, about 0.058, about 0.06, about 0.062, about 0.064, about 0.066, about 0.068, about 0.07, about 0.072, about 0.074, about 0.076, about 0.078, about 0.08, about 0.082, about 0.084, about 0.086, about 0.088, about 0.09, about 0.092, about 0.094, about 0.096, about 0.098, or about 0.1. In some embodiments, the value of A/B is about 0.005, about 0.0053, about 0.0122, about 0.04, about 0.0636, about 0.0889, about 0.0917, or about 0.1.

In some embodiments, the value of A ranges from 0.01 to 0.1, and the value of B ranges from 1.0 to 2.0.

In some embodiments, the value of A ranges from 0.02 to 0.1. In some embodiments, the value of A is about 0.01, about 0.015, about 0.02, about 0.025, about 0.03, about 0.035, about 0.04, about 0.045, about 0.05, about 0.055, about 0.06, about 0.065, about 0.07, about 0.075, about 0.08, about 0.085, about 0.09, about 0.095, or about 0.1. In some embodiments, the value of A is about 0.01, about 0.0195, about 0.02, about 0.052, about 0.07, about 0.08, about 0.09, or about 0.1.

In some embodiments, the value of B ranges from 1.1 to 1.6. In some embodiments, the value of B is about 1.0, about 1.1, about 1.2, about 1.3, about 1.4, about 1.5, about 1.6, about 1.7, about 1.8, about 1.9, or about 2.0. In some embodiments, the electrolyte includes a compound of formula I:

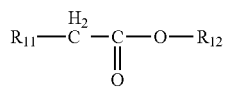

where $R_{11}$ is selected from hydrogen, a hydroxy group, a $C_{1-20}$ alkyl group, a $C_{1-20}$ alkoxy group, a $C_{2-20}$ alkenyl group, a $C_{6-30}$ aryl group, or a $C_{6-30}$ aryloxy group; and $R_{12}$ is selected from hydrogen, a $C_{1-20}$ alkyl group, $C_{2-20}$ alkenyl group, or $C_{6-30}$ aryl.

As has been found by the inventors, when the electrochemical apparatus further includes the compound of formula I, the diffusion performance of the electrolyte can be further improved, and the fast charging and discharging performance of the electrochemical apparatus can be further improved.

A mass of the compound of formula I corresponding to 1 g of the negative active material is X g, and the value of X ranges from 0.035 to 0.39.

In some embodiments, $R_{11}$ is selected from: hydrogen, a hydroxy group, a $C_{1-16}$ alkyl group, a $C_{1-12}$ alkyl group, a $C_{1-10}$ alkyl group, a $C_{1-8}$ alkyl group, a $C_{1-6}$ alkyl group or a $C_{1-4}$ alkyl group, a $C_{1-16}$ alkoxy group, a $C_{1-12}$ alkoxy group, a $C_{1-10}$ alkoxy group, a $C_{1-8}$ alkoxy group, a $C_{1-6}$ alkoxy group or a $C_{1-4}$ alkoxy group, a $C_{2-16}$ alkenyl group, a $C_{2-12}$ alkenyl group, a $C_{2-8}$ alkenyl group, a $C_{2-6}$ alkenyl group or a $C_{2-4}$ alkenyl group, a $C_{6-24}$ aryl group, a $C_{6-20}$ aryl group, a $C_{6-16}$ aryl group, a $C_{6-12}$ aryl group or a $C_{6-10}$ aryl group, or a $C_{6-24}$ aryloxy group, a $C_{6-20}$ aryloxy group, a $C_{6-16}$ aryloxy group, a $C_{6-12}$ aryloxy group or a $C_{6-10}$ aryloxy group.

In some embodiments, $R_{11}$ is selected from: hydrogen, a hydroxy group, a methyl group, an ethyl group, a propyl group, an isopropyl group, a butyl group, an isobutyl group, a pentyl group, or an isopentyl group.

In some embodiments, $R_{12}$ is selected from: hydrogen, a $C_{1-16}$ alkyl group, a $C_{1-12}$ alkyl group, a $C_{1-10}$ alkyl group, a $C_{1-8}$ alkyl group, a $C_{1-6}$ alkyl group or a $C_{1-4}$ alkyl group, a $C_{2-16}$ alkenyl group, a $C_{2-12}$ alkenyl group, a $C_{2-8}$ alkenyl group, a $C_{2-6}$ alkenyl group or a $C_{2-4}$ alkenyl group, or a $C_{6-24}$ aryl group, a $C_{6-20}$ aryl group, a $C_{6-16}$ aryl group, a $C_{6-12}$ aryl group or a $C_{6-10}$ aryl group.

In some embodiments, $R_{12}$ is selected from: hydrogen, a methyl group, an ethyl group, a propyl group, an isopropyl group, a butyl group, an isobutyl group, a pentyl group, or an isopentyl group.

In some embodiments, the value of X ranges from 0.05 to 0.3 or from 0.09 to 0.25. In some embodiments, the value of X is about 0.04, about 0.045, about 0.05, about 0.055, about 0.06, about 0.065, about 0.07, about 0.075, about 0.08, about 0.085, about 0.09, about 0.095, about 0.1, about 0.12, about 0.14, about 0.16, about 0.18, about 0.2, about 0.22, about 0.24, about 0.26, about 0.28, about 0.3, about 0.32, about 0.34, about 0.36, or about 0.38. In some embodiments, the value of X is about 0.035, about 0.093, about 0.25, about 0.32, or about 0.39.

In some embodiments, 0.67≤X/A≤20. When the ratio of X/A is in the range of 0.67 to 20, the viscosity of the electrolyte is low, and a stable SEI film is formed on the surface of the negative electrode, so that the lithium-ion battery has excellent fast charging and good cycle performance.

In some embodiments, the ratio X/A of X to A ranges from 1 to 20 or from 5 to 20. In some embodiments, the value of X/A is about 0.7, about 0.8, about 0.9, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, about 10, about 10.5, about 11, about 11.5, about 12, about 12.5, about 13, about 13.5, about 14, about 14.5, about 15, about 15.5, about 16, about 16.5, about 17, about 17.5, about 18, about 18.5, about 19, about 19.5, or about 20. In some embodiments, the value of X/A is about 0.67, about 1.79, about 4.77, about 12.82, about 16.41 or about 20.

In some embodiments, the compound of formula I includes at least one of the following compounds: methyl acetate, ethyl acetate, propyl acetate, methyl propionate, ethyl propionate, n-propyl propionate, isopropyl propionate, n-butyl propionate, isobutyl propionate, n-amyl propionate, isoamyl propionate, ethyl butyrate, n-propyl butyrate, propyl isobutyrate, n-pentyl butyrate, n-pentyl isobutyrate, n-butyl butyrate, isobutyl isobutyrate, or n-pentyl valerate.

In some embodiments, the compound of formula I is selected from at least one of ethyl acetate or ethyl propionate.

In some embodiments, 0.1≤X/P≤3, where the value of P is a porosity of the negative active material layer and P ranges from 0.13 to 0.35.

In some embodiments, the ratio X/P of X to P ranges from 0.3 to 3. In some embodiments, the value of X/P is about 0.3, about 0.5, about 0.7, about 0.9, about 1.1, about 1.3, about 1.5, about 1.7, about 1.9, about 2.1, about 2.3, about 2.5, about 2.7, about 2.9, or about 3.0. In some embodiments, the value of X/P is about 0.1, about 0.3, about 1.0, about 1.78, or about 3.

In some embodiments, the value of P is about 0.13, about 0.15, about 0.17, about 0.19, about 0.21, about 0.23, about 0.25, about 0.27, about 0.29, about 0.31, about 0.33, or about 0.35. In some embodiments, the value of P is about 0.13, about 0.18, about 0.25, about 0.31, or about 0.35.

In some embodiments, the electrolyte further includes vinylene carbonate, a mass of the vinylene carbonate corresponding to 1 g of the negative active material is C g, and 0.001≤C/B≤0.03.

In some embodiments, the ratio C/B of C to B ranges from 0.001 to 0.02. In some embodiments, the value of C/B is about 0.001, about 0.0015, about 0.002, about 0.0025, about 0.003, about 0.0035, about 0.004, about 0.0045, about 0.005, about 0.0055, about 0.006, about 0.0065, about 0.007, about 0.0075, about 0.008, about 0.0085, about 0.009, about 0.0095, about 0.01, about 0.015, about 0.02, about 0.025, or about 0.03. In some embodiments, the value of C/B is about 0.001, about 0.00125, about 0.01875, about 0.0025, about 0.003. When the ratio of C/B is within the above range, the decomposition amount and decomposition speed of the vinylene carbonate on the surface of the negative active material in the electrochemical apparatus are within appropriate ranges, and excessive high-resistance LiF is not formed, so that the fast charging performance and cycle performance of the electrochemical apparatus are further improved.

In some embodiments, the compound of formula I includes ethyl propionate, a mass of the ethyl propionate corresponding to 1 g of the negative active material is D g, and 1≤D/C≤240.

In some embodiments, the ratio D/C of D to C ranges from 1 to 200, from 1 to 100, from 1 to 50, or from 1 to 20. In some embodiments, the value of D/C is about 2, about 4, about 6, about 8, about 10, about 12, about 14, about 16, about 18, about 20, about 30, about 40, about 50, about 60, about 70, about 80, about 90, about 100, about 110, about 120, about 130, about 140, about 150, about 160, about 170, about 180, or about 190. In some embodiments, the value of D/C is about 1, about 1.5, about 2, about 2.5, about 3, about 3.5, or about 4.5. When the ratio of D/C is within the above range, the fast charging performance of the electrochemical apparatus can be further improved.

In some embodiments, the electrolyte further includes at least one of a compound of formula II or a compound of formula III:

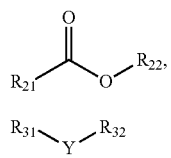

formula II formula III where $R_{21}$ and $R_{22}$ are each independently selected from a $C_{1-5}$ alkyl group that is unsubstituted or substituted with fluorine, and at least one of $R_{21}$ and $R_{22}$ contains fluorine;

$R_{31}$ and $R_{32}$ each are independently selected from a $C_{1-20}$ alkyl group that is unsubstituted or substituted with fluorine, at least one of $R_{31}$ and $R_{32}$ contains fluorine, and Y is selected from —O— or

In some embodiments, $R_{21}$ and $R_{22}$ are each independently selected from a $C_{1-3}$ alkyl group that is unsubstituted or substituted with one or more fluorine atoms, and at least one of $R_{21}$ and $R_{22}$ contains fluorine. In some embodiments, $R_{21}$ and $R_{22}$ are each independently selected from the following groups that are substituted with one or more fluorine atoms: a methyl group, an ethyl group, and a propyl group. In some embodiments, $R_{21}$ and $R_{22}$ are each independently selected from —$CH_3$, —$CH_2F$, —$CHF_2$, —$CF_3$, —$CH_2CH_3$, —$CH_2CH_2F$, —$CH_2CHF_2$, —$CH_2CF_3$, —$CHFCH_3$, —$CF_2CH_3$, —$CHFCH_2F$, or —$CH_2CH_2CH_3$.

In some embodiments, $R_{31}$ and $R_{32}$ each are independently selected from the following groups that are unsubstituted or substituted with fluorine: a $C_{1-16}$ alkyl group, a $C_{1-12}$ alkyl group, a $C_{1-8}$ alkyl group, a $C_{1-6}$ alkyl group, or a $C_{1-4}$ alkyl group, and at least one of $R_{31}$ and $R_{32}$ contains fluorine. In some embodiments, $R_{31}$ and $R_{32}$ are each independently selected from the following groups that are substituted with one or more fluorine atoms: a methyl group, an ethyl group, and a propyl group. In some embodiments, $R_{31}$ and $R_{32}$ are each independently selected from —$CH_2F$, —$CHF_2$, —$CH_2CH_2F$, —$CH_2CHF_2$, —$CH_2CF_3$, —$CHFCH_3$, —$CF_2CH_3$, —$CHFCH_2F$, —$CF_2CHF_2$, —$CF_3$, —$CF_2CF_3$, —$CF_2CF_2CF_3$, or —$CF(CF_3)_2$.

In some embodiments, a mass of the compound of formula II corresponding to 1 g of the negative active material is 0.015 g to 0.15 g.

In some embodiments, the mass of the compound of formula II corresponding to 1 g of the negative active material is 0.02 g to 0.1 g. In some embodiments, the mass of the compound of formula II corresponding to 1 g of the negative active material is about 0.015 g, about 0.02 g, about 0.025 g, about 0.03 g, about 0.035 g, about 0.04 g, 0.045 g, about 0.05 g, about 0.055 g, about 0.06 g, about 0.065 g, about 0.07 g, 0.075 g, about 0.08 g, about 0.085 g, about 0.09 g, about 0.095 g, about 0.1 g, about 0.11 g, about 0.12 g, about 0.13 g, about 0.14 g, or about 0.15 g. In some embodiments, the mass of the compound of formula II corresponding to 1 g of the negative active material is about 0.015 g, about 0.037 g, about 0.076 g, about 0.098 g, about 0.13 g, or about 0.15 g.

In some embodiments, a mass of the compound of formula III corresponding to 1 g of the negative active material is 0.015 g to 0.065 g.

In some embodiments, the mass of the compound of formula III corresponding to 1 g of the negative active material is 0.02 g to 0.6 g. In some embodiments, the mass of the compound of formula III corresponding to 1 g of the negative active material is about 0.02 g, about 0.04 g, about 0.06 g, about 0.08 g, about 0.1 g, 0.15 g, about 0.2 g, 0.25 g, about 0.3 g, 0.35 g, about 0.4 g, 0.45 g, about 0.5 g, 0.55 g, about 0.6 g, or 0.65 g. In some embodiments, the mass of the compound of formula III corresponding to 1 g of the negative active material is about 0.015 g, about 0.022 g, about 0.0036 g, about 0.053 g, or about 0.065 g.

In some embodiments, the compound of formula II includes at least one of the following compounds: methyl difluoroacetate, ethyl difluoroacetate, propyl difluoroacetate, methyl difluoropropionate, ethyl difluoropropionate, propyl difluoropropionate, methyl fluoroacetate, ethyl fluoroacetate, propyl fluoroacetate, methyl trifluoroacetate, ethyl trifluoroacetate, or propyl trifluoroacetate. In some embodiments, the compound of formula II includes ethyl difluoroacetate.

In some embodiments, the compound of formula III includes at least one of the following compounds: 1,1,2,2-tetrafluoroethyl-2,2,2-trifluoroethyl ether, or perfluoro(2-methyl-3-pentanone). In some embodiments, the compound of formula III includes 1,1,2,2-tetrafluoroethyl-2,2,2-trifluoroethyl ether.

In some embodiments, the electrolyte further includes a lithium salt and an organic solvent.

In some embodiments, the lithium salt is selected from at least one or more of an inorganic lithium salt or an organic lithium salt. In some embodiments, the lithium salt contains at least one of fluorine, boron, or phosphorus. In some embodiments, the lithium salt includes at least one of lithium hexafluorophosphate ($LiPF_6$), lithium bis(trifluoromethanesulfonyl)imide (LiTFSI for short), lithium bis(fluorosulfonyl)imide (LiFSI for short), lithium bis(oxalate)borate (LiBOB for short), lithium difluoro(oxalate)borate (LiDFOB), lithium hexafluoroarsenate ($LiAsF_6$), lithium perchlorate ($LiClO_4$), or lithium triflate ($LiCF_3SO_3$).

In some embodiments, a concentration of the lithium salt is 0.5 mol/L to 1.5 mol/L. In some embodiments, the concentration of the lithium salt is 0.8 mol/L to 1.2 mol/L.

In some embodiments, the organic solvent includes a carbonate solvent, the carbonate solvent includes a cyclic carbonate and a linear carbonate, and the cyclic carbonate is selected from at least one of ethylene carbonate (EC), propylene carbonate (PC), γ-butyrolactone (BL), or butylene carbonate; and the linear carbonate is selected from at least one of dimethyl carbonate (DMC), diethyl carbonate (DEC), ethyl methyl carbonate (EMC), and propyl ethyl carbonate. The amount of the cyclic carbonate is greater than that of the linear carbonate, and the solvent system preferably does not contain any linear carbonate.

In some embodiments, in order to further improve the fast charging performance of the lithium-ion battery, the electrolyte of this application has certain characteristics: the conductivity of the electrolyte is more than or equal to 7 mS/cm at 25° C. and more than or equal to 4 mS/cm at 0° C.; the viscosity of the electrolyte is less than or equal to 6 mPa*s at 25° C. and less than or equal to 9 mPa*s at 0° C.; and the surface tension of the electrolyte is less than or equal to 40 mN/m at 25° C.

When the electrolyte has a higher conductivity, a lower viscosity and a lower surface tension, the transport speed of the lithium ions is faster, facilitating the implementation of fast charging of the lithium-ion battery; and when the electrolyte has a lower conductivity, a higher viscosity and a higher surface tension, the transport of the lithium ions is hindered, impeding the improvement of the fast charging and discharging performance.

Negative Electrode

A negative electrode of the electrochemical apparatus according to this application includes a current collector and a negative active material layer provided on the current collector. The negative active material layer includes a negative active material. The specific type of the negative active material is not limited, and can be selected according to needs.

The negative electrode can be prepared by using a preparation method known in the art. For example, the negative electrode may be obtained by using the following method: an active material, a conductive material, and a binder are mixed in a solvent to prepare an active material composition, and the active material composition is coated on a current collector.

The negative active material includes a material that reversibly intercalates and deintercalates lithium ions. In some embodiments, the material that reversibly intercalates and deintercalates lithium ions includes a carbon material. In some embodiments, the carbon material may be any carbon-based negative active material commonly used in a lithium-ion rechargeable battery. In some embodiments, the carbon material includes, but is not limited to: crystalline carbon, amorphous carbon, or a mixture thereof. The crystalline carbon may be amorphous, plate-shaped, flake-shaped, spherical or fiber-shaped natural graphite or artificial graphite. The amorphous carbon may be soft carbon, hard carbon, a mesophase pitch carbide, calcined coke, or the like.

In some embodiments, the negative active material includes, but is not limited to: lithium metal, structured lithium metal, natural graphite, artificial graphite, a mesocarbon microbead (MCMB for short), hard carbon, soft carbon, silicon, a silicon or silica containing material, a silicon-carbon compound, or any combination thereof.

Figure 2:
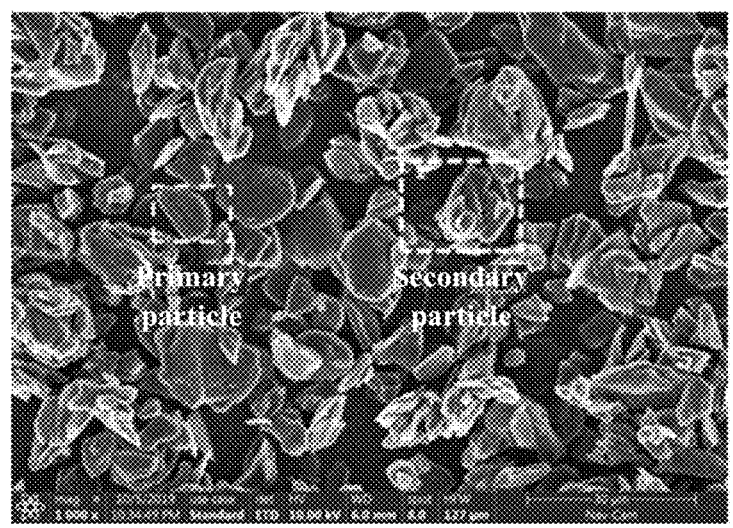
FIG. 2 is a schematic diagram of primary particles and secondary particles of a negative active material in one embodiment.

In some embodiments, the negative active material is composed of single particles and secondary particles. FIG. 2 shows a schematic diagram of primary particles and secondary particles of a negative active material.

In some embodiments, the raw materials of the negative active material include a raw material A and a raw material B, a Dv50 of one particle of the raw material A is 3 microns to 10 microns, a Dv50 of one particle of the raw material B is 2 microns to 10 microns, and a Dv50 of secondary particles prepared by granulation is 5 microns to 20 microns; and the raw material A and the raw material B are added in a ratio of 1:9 to 5:5.

In some embodiments, an OI value (C004/C110, that is, a ratio of a peak area of a 004 peak to a peak area of a 110 peak of the negative active material) of the negative active material ranges from 8 to 15, which greatly shortens the transport distance of lithium ions in the negative active material, reduces $R_{cp}$ of the lithium-ion battery, increases the transport rate of the lithium ions, and improves the fast charging performance.

In some embodiments, the negative active material may further include the following orientations:

a layer structure distribution ratio of orientation 1 is 6% to 25%, a layer structure distribution ratio of orientation 2 is 27% to 65%, and a layer structure distribution ratio of orientation 3 is 5% to 10%. Taking a direction parallel to the current collector as a plane direction, particles inclined at an angle of 0 to 20 degrees from the current collector are in orientation 1, particles inclined at an angle of 20 to 70 degrees from the current collector are in orientation 2, and particles inclined at an angle of 70 to 90 degrees from the current collector are in orientation 3.

In some embodiments, a specific surface area (BET) of the negative active material is 1.0 m$^2$/g to 2.0 m$^2$/g.

In some embodiments, the negative active material layer may include a binder, and optionally includes a conductive material. The binder enhances binding between particles of the negative active material, and binding between the negative active material and the current collector. In some embodiments, the binder includes, but is not limited to: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(vinylidene fluoride), polyethylene, polypropylene, styrene-butadiene rubber, acrylic styrene-butadiene rubber, epoxy resin, nylon, and the like.

In some embodiments, the conductive material includes, but is not limited to: a carbon-based material, a metal-based material, a conductive polymer, or a mixture thereof. In some embodiments, the carbon-based material is selected from natural graphite, artificial graphite, carbon black, acetylene black, Ketjen black, carbon fibers, or any combination thereof. In some embodiments, the metal-based material is selected from metal powder, metal fibers, copper, nickel, aluminum, and silver. In some embodiments, the conductive polymer is a polyphenylene derivative.

In the electrochemical apparatus according to this application, the current collector of the negative electrode may be selected from copper foil, nickel foil, stainless steel foil, titanium foil, nickel foam, copper foam, a polymer substrate coated with a conductive metal, or a combination thereof. In some embodiments, the current collector includes a copper foil.

Positive Electrode

The positive electrode used in the electrochemical apparatus of this application may be prepared by using materials, constructions and manufacturing methods well known in the art. In some embodiments, the positive electrode of this application may be prepared by using the technology described in U.S. Pat. No. 9,812,739B, which is incorporated herein by reference in its entirety.

In some embodiments, the positive electrode includes a current collector and a positive active material layer on the current collector, and the positive active material layer includes a positive active material. The positive active material includes at least one lithiated intercalation compound that reversibly intercalates and deintercalates lithium ions. In some embodiments, the positive active material includes a composite oxide. In some embodiments, the composite oxide contains lithium and at least one element selected from cobalt, manganese and nickel.

In some embodiments, the positive active material is selected from one or more of lithium cobalt oxide, lithium manganate oxide, lithium nickel oxide, lithium nickel cobalt manganate, or lithium nickel cobalt aluminate.

In some embodiments, the positive active material may have a coating on its surface, or may be mixed with another compound having a coating. The coating may include at least one coating element compound selected from an oxide of a coating element, a hydroxide of a coating element, an oxyhydroxide of a coating element, an oxycarbonate of a coating element, and a hydroxy carbonate of a coating element. The compound used in the coating may be amorphous or crystalline.

In some embodiments, the coating element contained in the coating may include Mg, Al, Co, K, Na, Ca, Si, Ti, V, Sn, Ge, Ga, B, As, Zr, or any combination thereof. The coating may be applied by any method as long as the method does not produce adverse effects on the performance of the positive active material. For example, the method may include any coating method known in the art, such as spraying and dipping.

In some embodiments, the positive active material layer further includes a binder, and optionally includes a conductive material. The binder enhances binding between particles of the positive active material, and binding between the positive active material and the current collector.

In some embodiments, the binder includes, but is not limited to: polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(vinylidene fluoride), polyethylene, polypropylene, styrene-butadiene rubber, acrylic styrene-butadiene rubber, epoxy resin, nylon, and the like.

In some embodiments, the conductive material includes, but is not limited to: a carbon-based material, a metal-based material, a conductive polymer, and a mixture thereof. In some embodiments, the carbon-based material is selected from natural graphite, artificial graphite, carbon black, acetylene black, Ketjen black, carbon fibers, or any combination thereof. In some embodiments, the metal-based material is selected from metal powder, metal fibers, copper, nickel, aluminum, and silver. In some embodiments, the conductive polymer is a polyphenylene derivative.

In some embodiments, the current collector may be, but is not limited to, aluminum.

The positive electrode may be prepared by using a preparation method known in the art. For example, the positive electrode may be obtained by using the following method: an active material, a conductive material, and a binder are mixed in a solvent to prepare an active material composition, and the active material composition is coated on a current collector. In some embodiments, the solvent may include, but is not limited to, N-methylpyrrolidone and the like.

In some embodiments, the positive electrode is prepared from a positive electrode material formed by using a positive active material layer including lithium transition metal series compound powder and a binder on the current collector.

In some embodiments, the positive active material layer usually can be prepared by the following operations: a positive electrode material and a binder (a conductive material and a thickener used as required) are mixed by using a dry process to form a sheet, and the obtained sheet is connected to a positive current collector by pressing, or these materials are dissolved or dispersed in a liquid medium to form a slurry, and the slurry is coated on the positive current collector and dried. In some embodiments, the material in the positive active material layer includes any material known in the art.

Separator

In some embodiments, the electrochemical apparatus according to this application is provided with a separator between the positive electrode and the negative electrode to prevent short circuit. The separator used in the electrochemical apparatus according to this application is not particularly limited to any material or shape, and may be based on any technology disclosed in the prior art. In some embodiments, the separator includes a polymer or an inorganic substance formed by a material stable to the electrolyte of this application.

For example, the separator may include a substrate layer and a surface finishing layer. The substrate layer is a non woven fabric, membrane, or composite membrane having a porous structure, and a material of the substrate layer is selected from at least one of polyethylene, polypropylene, polyethylene glycol terephthalate, and polyimide. Specifically, a polypropylene porous membrane, a polyethylene porous membrane, polypropylene non woven fabric, polyethylene non woven fabric, or polypropylene-polyethylene-polypropylene porous composite membrane can be selected. The substrate layer may be one or more layers; when the substrate layer is multilayer, the polymers of the different substrate layers may have the same or different compositions and different weight average molecular weights; and when the substrate layer is multilayer, the polymers of the different substrate layers have different closed pore temperatures.

In some embodiments, the surface finishing layer is provided on at least one surface of the substrate layer, and the surface finishing layer may be a polymer layer or an inorganic layer, or may be a layer formed by mixing a polymer and an inorganic substance.

In some embodiments, the inorganic layer includes inorganic particles and a binder. The inorganic particles are selected from one or a combination of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from one or a combination of a polyvinylidene fluoride, a vinylidene fluoride-hexafluoropropylene copolymer, a polyamide, a polyacrylonitrile, a polyacrylate, a polyacrylic acid, a polyacrylate, a polyvinylpyrrolidone, a polyvinyl ether, a polymethyl methacrylate, a polytetrafluoroethylene, and a polyhexafluoropropylene. The polymer layer includes a polymer, and a material of the polymer includes at least one of a polyamide, a polyacrylonitrile, an acrylate polymer, a polyacrylic acid, a polyacrylate, a polyvinylpyrrolidone, a polyvinyl ether, a polyvinylidene fluoride, or a poly(vinylidene fluoride-hexafluoropropylene).

Application

The electrochemical apparatus according to the embodiments of this application is characterized by improved cycle performance and high-temperature stability under over-discharge conditions, and is suitable for use in various electronic devices.

The electrochemical apparatus according to this application is not particularly limited to any purpose, and may be used for any known purposes. For example, the electrochemical apparatus may be used for a notebook computer, a pen-input computer, a mobile computer, an electronic book player, a portable telephone, a portable fax machine, a portable copier, a portable printer, a headset, a video recorder, a liquid crystal television, a portable cleaner, a portable CD player, a mini-disc, a transceiver, an electronic notebook, a calculator, a storage card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, and a lithium-ion capacitor.

EXAMPLES

Below, this application will be further specifically described with examples and comparative examples, and this application is not limited to these examples as long as the essence of this application is not changed.

I. Preparation of a Lithium-Ion Battery (1) Preparation of a Negative Electrode

A negative active material included first particles and second particles, the first particles were secondary particles, and the secondary particles included not less than two primary particles. A Dv50 of the primary particles among the secondary particles was 2 microns to 10 microns, and a Dv50 of the secondary particles was 5 microns to 20 microns. The second particles were primary particles, and a Dv50 of the second particles was 3 microns to 10 microns.

Negative active materials with different specific surface areas and porosities were obtained by controlling the graphitization temperature and the proportion of the first particles to the second particles during preparation, and the graphitization temperature ranged from 2500 to 3200 degrees Celsius. Exemplary specific surface areas (B) and porosities (P) were shown in the following tables.

Artificial graphite as a negative active material having an OI value (C004/C110) of 8 to 15, styrene-butadiene rubber (SBR for short) as a binder, and sodium carboxymethyl cellulose (CMC for short) as a thickener were thoroughly mixed in an appropriate amount of deionized water solvent at a weight ratio of 97.4:1.2:1.4 to form a uniform negative slurry; and the slurry was coated on a copper foil of a negative current collector, and drying and cold pressing were performed to obtain the negative electrode.

(2) Preparation of a Positive Electrode

Lithium cobalt oxide (the molecular formula is $LiCoO_2$) as a positive active material, acetylene black as a conductive agent, and polyvinylidene fluoride (PVDF for short) as a binder were thoroughly mixed in an appropriate amount of N-methylpyrrolidone (NMP for short) solvent at a weight ratio of 96:2:2 to form a uniform positive slurry; and the slurry was coated on an aluminum foil of a positive current collector, and drying and cold pressing were performed to obtain the positive electrode.

(3) Preparation of an Electrolyte

Preparation of an electrolyte: in a glove box under argon atmosphere with a water content of <10 ppm, ethylene carbonate (EC), propylene carbonate (PC), and diethyl carbonate (DEC) were uniformly mixed in a mass ratio of 3:3:4 to obtain a non-aqueous solvent, then a sufficiently dried lithium salt $LiPF_6$ was dissolved in the non-aqueous solvent, and specific types and amounts of additives (the types and amounts of the added substances were shown in the following tables) were added. The amount of each additive in the electrolyte was calculated by the mass (unit: gram) of the additive required for 1 g of the negative active material. The concentration of $LiPF_6$ in the electrolyte was about 1 mol/L.

(4) Preparation of a Separator

A polyethylene separator having a thickness of 9 microns was used.

(5) Preparation of a Lithium-Ion Battery

A positive electrode, a separator, and a negative electrode were laid in order with the separator between the positive electrode and the negative electrode for isolation, and then wound to obtain an electrode assembly; and the electrode assembly was placed in an outer packaging aluminum-plastic film, the prepared electrolyte was injected into a dried battery, and the preparation of the lithium-ion battery was completed after processes such as vacuum packaging, standing, chemical conversion, and shaping.

II. Lithium-Ion Battery Performance Tests (1) Electrochemical Resistance Spectroscopy (EIS-$R_{ct}$ Test)

A three-electrode lithium-ion battery was prepared: a positive electrode, a separator, and a negative electrode were placed in order, so that the separator was between the positive electrode and the negative electrode for isolation; a fine copper wire was welded to a side of the separator close to the negative electrode, and the copper wire was covered with a small piece of separator so as to avoid contact with the negative electrode; then the positive electrode, the separator, and the negative electrode were wound to obtain an electrode assembly, the electrode assembly was placed in an outer packaging aluminum-plastic film, the prepared electrolyte was injected into a dried battery, and the preparation of the three-electrode lithium-ion battery was completed after processes such as vacuum packaging, standing, chemical conversion, and shaping.

Figure 3A:
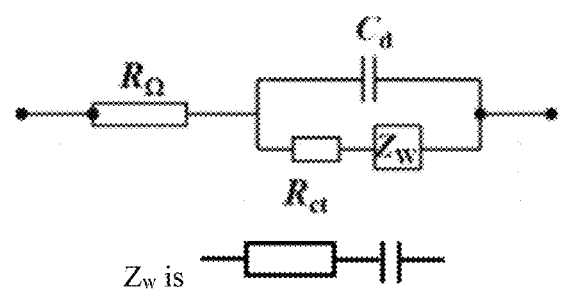
FIG. 3A is a simulated equivalent circuit of $R_{ct}$.
Figure 3B:
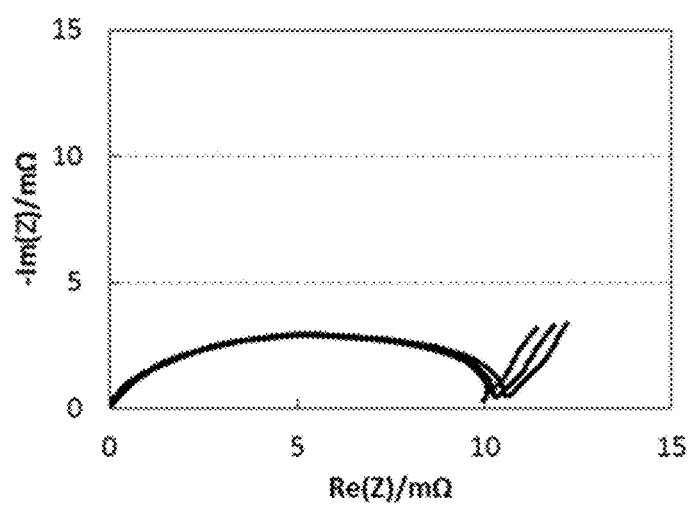
FIG. 3B is an EIS test graph of a lithium-ion battery in one embodiment.

The prepared three-electrode lithium-ion battery was placed in an electrochemical workstation, and connected according to a sequence of working electrodes and a reference electrode. Sine wave alternating current signals with an amplitude of 5 mV and a frequency of 500 KHz to 30 mHz were applied to the electrochemical system to obtain corresponding electrical signal feedbacks within the frequency domain range, and simulation was performed according to a model shown in FIG. 3A to obtain an EIS curve (shown in FIG. 3B) of the lithium-ion battery. The right intersection of the first semicircular arc with the X-axis was a charge transfer resistance value, i.e. $R_{ct}$ in the Examples, and $R_{ct}$ described in this application was a value under 50% SOC (state of charge), in units of milliohms.

(2) Direct Current Resistance Test (DCR-$R_{cp}$ Test)

The lithium-ion battery was charged to 4.4 V at a constant current of 1.5 C and then to 0.05 C at the constant voltage. The lithium-ion battery was stood for 30 minutes, discharged at a current of 0.1 C for 10 seconds (a point was taken once at 0.1 second and a corresponding voltage value U1 was recorded), and discharged at a current of 1 C for 360 seconds (a point was taken once at 0.1 second and a corresponding voltage value U2 was recorded). The charging and discharging steps were repeated 5 times. "1 C" was a current value that completely discharged the capacity of the battery within one hour.

A direct current resistance (DCR) was calculated according to the following equation: R=(U2−U1)/(1 C−0.1 C). The obtained DCR was a concentration polarization resistance of this application, which was a value at 50% SOC (state of charge), that is, $R_{cp}$ in the examples, in units of milliohms.

(3) Lithium Plating Test

At 25° C., the lithium-ion battery was charged to 4.4 V at a current of 1.5 C, charged to 0.05 C at the constant voltage of 4.4 V, and discharged to 3.0 V at a constant current of 1.0 C, this process was cycled for 30 times, and then the lithium-ion battery was disassembled to observe the degree of lithium plating. No lithium plating or lithium plating area <2% was referred to herein as no lithium plating; a lithium precipitation area between 2% and 20% was referred to as slight lithium plating; and a lithium plating area >20% was referred to as severe lithium plating.

(4) Temperature Rise Test

At a temperature of 25° C., the lithium-ion battery was charged to 4.4 V at a constant current of 0.5 C, then charged to 0.05 C at the constant voltage, and stood for 60 minutes; then, the lithium-ion battery was discharged to 3 V at the constant current of 0.5 C and stood for 60 minutes; and the lithium-ion battery was charged to 4.4 V at a constant current of 8 C and then charged to 0.05 C at the constant voltage to obtain a maximum temperature in the 8 C current charging process, and the maximum temperature was subtracted from the test temperature 25° C. to obtain a temperature rise value (temperature rise for short) during 8 C charging, in units of degrees centigrade.

(5) 45° C. Cycling Test

The battery was put into a 45° C. incubator, charged to 4.4 V at a constant current of 1.5 C, charged to 0.05 C at the constant voltage of 4.4 V, and then discharged to 3.0 V at a constant current of 1.0 C. This was one charging and discharging cycle, 800 cycles of charging and discharging tests were carried out according to this mode, and the capacity retention rate was monitored.

Capacity retention rate=residual discharge capacity/ initial discharge capacity×100%.

(6) Conductivity Test

A standard test method of a DDS-307 Leici conductivity meter was used for testing.

(7) Viscosity Test

A standard test method of a DV2T viscometer was used for testing.

(8) Surface Tension Test

A standard method of a BZY202 surface tension meter was used.

A. Lithium-Ion Batteries of Examples 1 to 8 and Comparative Examples 1 to 3 were Prepared According to the Above Method, and the Test Results were Shown in Table 1.

TABLE 1

| Example | Fluoroethylene carbonate (FEC) A (g) | B (m²/g) | A/B | $R_{ct}$ (milliohm) | $R_{cp}$ (milliohm) | $R_{ct}/R_{cp}$ | Whether lithium plating | Temperature rise during 8 C. charging (° C.) | Capacity retention rate after cycling at 45° C. |
|---|---|---|---|---|---|---|---|---|---|
| Example 1 | 0.008 | 1.5 | 0.0053 | 18.5 | 34.3 | 0.54 | Lithium plating | 39.1 | 49.3% |
| Example 2 | 0.01 | 2 | 0.0050 | 22.1 | 31.1 | 0.71 | Slight lithium plating | 30.2 | 69.9% |
| Example 3 | 0.0195 | 1.6 | 0.0122 | 24.7 | 26.8 | 0.92 | Slight lithium plating | 23.1 | 73.4% |
| Example 4 | 0.052 | 1.3 | 0.0400 | 23.9 | 23.2 | 1.03 | Slight lithium plating | 22.4 | 74.2% |
| Example 5 | 0.07 | 1.1 | 0.0636 | 25.8 | 22.4 | 1.15 | Slight lithium plating | 24.3 | 70.5% |
| Example 6 | 0.1 | 1 | 0.1000 | 26.5 | 21.5 | 1.23 | Lithium plating | 27.6 | 69.7% |
| Example 7 | 0.11 | 1.2 | 0.0917 | 29.7 | 21.7 | 1.37 | Lithium plating | 39.5 | 60.7% |
| Example 8 | 0.08 | 0.9 | 0.0889 | 34.3 | 23.3 | 1.47 | Lithium plating | 37.2 | 51.7% |
| Comparative Example 1 | 0.02 | 4.2 | 0.0048 | 30.0 | 61.0 | 0.49 | Severe lithium plating | 53.5 | 40.6% |
| Comparative Example 2 | 0.09 | 0.8 | 0.1125 | 54.0 | 57.0 | 0.95 | Severe lithium plating | 50.7 | 38.4% |
| Comparative Example 3 | 0.09 | 4.2 | 0.0214 | 45.0 | 24.0 | 1.88 | Severe lithium plating | 49.5 | 45.1% |

As can be seen from Table 1, Examples 1 to 8 all met the requirement (1) "0.5<$R_{ct}/R_{cp}$<1.5 and both $R_{ct}$ and $R_{cp}$ are less than 35 milliohms" and the requirement (2) "0.005≤A/B≤0.1"; but Comparative Examples 1 to 3 did not meet the requirements (1) and (2). Therefore, in the three cycling tests, temperature rise and lithium plating, Examples 1 to 8 obviously achieved better technical effects than Comparative Examples 1 to 3; and the comprehensive improvement effects of Examples 2 to 5 were particularly significant in the three tests.

B. The Lithium-Ion Batteries of Examples 9 to 15 were Prepared According to the Above Method, and the Test Results were Shown in Table 2.

TABLE 2

| Example | Compound of formula I X (g) | FEC A (g) | B (m²/g) | A/B | X/A | $R_{ct}$ (milliohm) | $R_{cp}$ (milliohm) | $R_{ct}/R_{cp}$ | Whether lithium plating | Temperature rise during 8 C. charging (° C.) | Capacity retention rate after cycling at 45° C. |
|---|---|---|---|---|---|---|---|---|---|---|---|
| Example 2 | None | 0 | 0.01 | 2 | 0.0050 | 0 | 22.1 | 31.1 | 0.71 | Slight lithium plating | 30.2 | 69.9% |
| Example 3 | None | 0 | 0.0195 | 1.6 | 0.0122 | 0 | 24.7 | 26.8 | 0.92 | Slight lithium plating | 23.1 | 73.4% |

TABLE 2-continued

| Example | Compound of formula I X (g) | FEC A (g) | B (m²/g) | A/B | X/A | $R_{ct}$ (milliohm) | $R_{cp}$ (milliohm) | $R_{ct}/R_{cp}$ | Whether lithium plating | Temperature rise during 8 C. charging (° C.) | Capacity retention rate after cycling at 45° C. |
|---|---|---|---|---|---|---|---|---|---|---|---|
| Example 4 | None | 0 | 0.052 | 1.3 | 0.0400 | 0 | 23.9 | 23.2 | 1.03 | Slight lithium plating | 22.4 | 74.2% |
| Example 9 | Ethyl acetate | 0.035 | 0.0195 | 1.6 | 0.0122 | 1.79 | 23.7 | 25.7 | 0.92 | Slight lithium plating | 20.7 | 75.5% |
| Example 10 | Ethyl acetate | 0.093 | 0.0195 | 1.6 | 0.0122 | 4.77 | 22.5 | 23.1 | 0.97 | Slight lithium plating | 18.1 | 77.4% |
| Example 11 | Ethyl acetate | 0.25 | 0.0195 | 1.6 | 0.0122 | 12.82 | 20.3 | 19.5 | 1.04 | No lithium plating | 17.9 | 78.0% |
| Example 12 | Ethyl acetate | 0.32 | 0.0195 | 1.6 | 0.0122 | 16.41 | 18.7 | 15.7 | 1.19 | No lithium plating | 16.3 | 75.3% |
| Example 13 | Ethyl acetate | 0.39 | 0.0195 | 1.6 | 0.0122 | 20.00 | 17.9 | 13.2 | 1.36 | No lithium plating | 15.6 | 73.6% |
| Example 14 | Ethyl acetate | 0.035 | 0.052 | 1.3 | 0.0400 | 0.67 | 34.8 | 25.7 | 1.35 | Slight lithium plating | 22.8 | 74.4% |
| Example 15 | Ethyl acetate | 0.28 | 0.01 | 2 | 0.0050 | 28.00 | 22.1 | 15.1 | 1.46 | Lithium plating | 32.2 | 63.4% |

As can be seen from Table 2, an appropriate amount X g of the compound of formula I (for example, ethyl acetate) was further added in the electrolyte containing a fluoroethylene carbonate (FEC), so that Examples 9 to 14 met the requirement (1) "$0.5<R_{ct}/R_{cp}<1.5$ and both $R_{ct}$ and $R_{cp}$ are less than 35 milliohms" and the requirement (2) "$0.005 \leq A/B \leq 0.1$", and further met the requirement (3) "$0.67 \leq X/A \leq 20$". Therefore, in the three tests of cycling, temperature rise and lithium plating, compared with Examples 2 to 4 and 15 which met the requirements (1) and (2) but did not meet the requirement (3), Examples 9 to 14 obviously achieved better technical effects; and the comprehensive improvement effects of Examples 10 to 13 were particularly significant in the three tests.

C. The Lithium-Ion Batteries of Examples 16 to 21 were Prepared According to the Above Method, and the Test Results were Shown in Table 3.

TABLE 3

| Example | Compound of formula I X (g) | FEC A (g) | B (m²/g) | A/B | X/A | P | X/P | $R_{ct}$ (milliohm) | $R_{cp}$ (milliohm) | $R_{ct}/R_{cp}$ | Whether lithium plating | Temperature rise during 8 C. charging (° C.) | Capacity retention rate after cycling at 45° C. |
|---|---|---|---|---|---|---|---|---|---|---|---|---|---|
| Example 9 | Ethyl acetate | 0.035 | 0.0195 | 1.6 | 0.0122 | 1.79 | 0.37 | 0.09 | 23.7 | 25.7 | 0.92 | Slight lithium plating | 20.7 | 75.5% |
| Example 16 | Ethyl acetate | 0.035 | 0.0195 | 1.6 | 0.0122 | 1.79 | 0.35 | 0.10 | 22.5 | 21.3 | 1.06 | No lithium plating | 18.9 | 76.3% |
| Example 10 | Ethyl acetate | 0.093 | 0.0195 | 1.6 | 0.0122 | 4.77 | 0.37 | 0.25 | 22.5 | 23.1 | 0.97 | Slight lithium plating | 18.1 | 77.4% |
| Example 17 | Ethyl acetate | 0.093 | 0.0195 | 1.6 | 0.0122 | 4.77 | 0.31 | 0.30 | 21.2 | 21.5 | 0.99 | No lithium plating | 17.5 | 78.3% |
| Example 11 | Ethyl acetate | 0.25 | 0.0195 | 1.6 | 0.0122 | 12.82 | 0.37 | 0.68 | 20.3 | 19.5 | 1.04 | No lithium plating | 17.9 | 78.0% |
| Example 18 | Ethyl acetate | 0.25 | 0.0195 | 1.6 | 0.0122 | 12.82 | 0.25 | 1.00 | 19.6 | 16.7 | 1.17 | No lithium plating | 16.5 | 78.7% |
| Example 12 | Ethyl acetate | 0.32 | 0.0195 | 1.6 | 0.0122 | 16.41 | 0.37 | 0.86 | 18.7 | 15.7 | 1.19 | No lithium plating | 16.3 | 75.3% |
| Example 19 | Ethyl acetate | 0.32 | 0.0195 | 1.6 | 0.0122 | 16.41 | 0.18 | 1.78 | 17.6 | 14.3 | 1.23 | No lithium plating | 15.1 | 76.7% |
| Example 13 | Ethyl acetate | 0.39 | 0.0195 | 1.6 | 0.0122 | 20.00 | 0.37 | 1.05 | 17.9 | 13.2 | 1.36 | No lithium plating | 15.6 | 73.6% |
| Example 20 | Ethyl acetate | 0.39 | 0.0195 | 1.6 | 0.0122 | 20.00 | 0.13 | 3.00 | 16.4 | 12.7 | 1.29 | No lithium plating | 15.3 | 73.8% |
| Example 21 | Ethyl acetate | 0.39 | 0.0195 | 1.6 | 0.0122 | 20.00 | 0.12 | 3.25 | 18.2 | 14.6 | 1.25 | Slight lithium plating | 17.5 | 71.3% |

As can be seen from Table 3, Examples 16 to 20 met the requirement (1) "0.5<$R_{ct}/R_{cp}$<1.5 and both $R_{ct}$ and $R_{cp}$ are less than 35 milliohms", the requirement (2) "0.005≤A/B≤0.1" and the requirement (3) "0.67≤X/A≤20", and further met the requirement (4) "0.1≤X/P≤3, where the value of P ranges from 0.13 to 0.35". Therefore, in the three tests of cycling, temperature rise and lithium plating, compared with Examples 9 to 13 and 21 which met the requirements (1) to (3) but did not meet the requirement (4), Examples 16 to 20 obviously achieved better technical effects.

D. The Lithium-Ion Batteries of Examples 22 to 27 were Prepared According to the Above Method, and the Test Results were Shown in Table 4.

TABLE 4

| Example | Compound of formula I | X (g) | A (g) | B (m²/g) | A/B | X/A | C (g) | C/B | $R_{ct}$ (milliohm) | $R_{cp}$ (milliohm) | $R_{ct}/R_{cp}$ | Whether lithium plating | Temperature rise during 8 C. charging (° C.) | Capacity retention rate after cycling at 45° C. |
|---|---|---|---|---|---|---|---|---|---|---|---|---|---|---|
| Example 10 | Ethyl acetate | 0.093 | 0.0195 | 1.6 | 0.0122 | 4.77 | 0 | 0 | 22.5 | 23.1 | 0.97 | Slight lithium plating | 18.1 | 77.4% |
| Example 22 | Ethyl acetate | 0.093 | 0.0195 | 1.6 | 0.0122 | 4.77 | 0.0016 | 0.001 | 21.3 | 22.9 | 0.93 | No lithium plating | 17.9 | 78.5% |
| Example 23 | Ethyl acetate | 0.093 | 0.0195 | 1.6 | 0.0122 | 4.77 | 0.02 | 0.0125 | 20.9 | 22.3 | 0.94 | No lithium plating | 17.5 | 78.9% |
| Example 24 | Ethyl acetate | 0.093 | 0.0195 | 1.6 | 0.0122 | 4.77 | 0.03 | 0.01875 | 21.7 | 21.8 | 1.00 | Slight lithium plating | 17.6 | 78.7% |
| Example 25 | Ethyl acetate | 0.093 | 0.0195 | 1.6 | 0.0122 | 4.77 | 0.04 | 0.025 | 22 | 22.4 | 0.98 | Slight lithium plating | 17.7 | 77.8% |
| Example 26 | Ethyl acetate | 0.093 | 0.0195 | 1.6 | 0.0122 | 4.77 | 0.048 | 0.03 | 22.3 | 22.7 | 0.98 | Slight lithium plating | 18 | 77.5% |
| Example 27 | Ethyl acetate | 0.093 | 0.0195 | 1.6 | 0.0122 | 4.77 | 0.05 | 0.03125 | 24.2 | 23.6 | 1.03 | Lithium plating | 18.8 | 73.4% |

As can be seen from Table 4, vinylene carbonate (VC) was further added to the electrolyte containing a fluoroethylene carbonate (FEC) and the compound of formula I (for example, ethyl acetate), so that Examples 22 to 26 met the requirement (1) "0.5<$R_{ct}/R_{cp}$<1.5 and both $R_{ct}$ and $R_{cp}$ are less than 35 milliohms", the requirement (2) "0.005≤A/B≤0.1" and the requirement (3) "0.67≤X/A≤20", and further met the requirement (5) "0.001≤C/B≤0.03". Therefore, in the three tests of cycling, temperature rise and lithium plating, compared with Examples 10 and 27 which met the requirements (1) to (3) but did not meet the requirement (5), Examples 22 to 26 obviously achieved better technical effects.

E. The Lithium-Ion Batteries of Examples 28 to 34 were Prepared According to the Above Method, the Mass Ratio of Ethyl Acetate to Propyl Propionate in Example 34 was 1:1, and the Test Results were Shown in Table 5.

TABLE 5

| Example | formula I Compound | A (g) | B (m²/g) | A/B | X (g) | X/A | C (g) | C/B | D (g) | D/C |
|---|---|---|---|---|---|---|---|---|---|---|
| Example 23 | Ethyl acetate | 0.0195 | 1.6 | 0.0122 | 0.093 | 4.77 | 0.02 | 0.0125 | 0 | 0 |
| Example 28 | Ethyl acetate, ethyl propionate | 0.0195 | 1.6 | 0.0122 | 0.093 | 4.77 | 0.02 | 0.0125 | 0.02 | 1 |
| Example 29 | Ethyl acetate, ethyl propionate | 0.0195 | 1.6 | 0.0122 | 0.093 | 4.77 | 0.02 | 0.0125 | 0.03 | 1.5 |
| Example 30 | Ethyl acetate, ethyl propionate | 0.0195 | 1.6 | 0.0122 | 0.093 | 4.77 | 0.02 | 0.0125 | 0.04 | 2 |
| Example 31 | Ethyl acetate, ethyl propionate | 0.0195 | 1.6 | 0.0122 | 0.093 | 4.77 | 0.02 | 0.0125 | 0.05 | 2.5 |

TABLE 5-continued

| | | | | | | | | | | |
|---|---|---|---|---|---|---|---|---|---|---|
| Example 32 | Ethyl acetate, ethyl propionate | 0.0195 | 1.6 | 0.0122 | 0.093 | 4.77 | 0.02 | 0.0125 | 0.06 | 3 |
| Example 33 | Ethyl acetate, ethyl propionate | 0.0195 | 1.6 | 0.0122 | 0.093 | 4.77 | 0.02 | 0.0125 | 0.07 | 3.5 |
| Example 34 | Ethyl acetate, ethyl propionate, propyl propionate | 0.0195 | 1.6 | 0.0122 | 0.093 | 4.77 | 0.02 | 0.0125 | 0.09 | 4.5 |

| Example | $R_{ct}$ (milliohm) | $R_{cp}$ (milliohm) | $R_{ct}/R_{cp}$ | Whether lithium plating | Temperature rise during 8 C. charging (° C.) | Capacity retention rate after cycling at 45° C. |
|---|---|---|---|---|---|---|
| Example 23 | 20.9 | 22.3 | 0.94 | No lithium plating | 17.5 | 78.9% |
| Example 28 | 20.7 | 21.9 | 0.95 | No lithium plating | 17.3 | 79.0% |
| Example 29 | 19.1 | 18.2 | 1.05 | No lithium plating | 16.4 | 79.6% |
| Example 30 | 18.5 | 17.1 | 1.08 | No lithium plating | 14.9 | 79.8% |
| Example 31 | 17.2 | 15.8 | 1.09 | No lithium plating | 13.7 | 79.7% |
| Example 32 | 16.6 | 14.7 | 1.13 | No lithium plating | 13.4 | 79.5% |
| Example 33 | 16.5 | 14.5 | 1.14 | No lithium plating | 13.2 | 79.1% |
| Example 34 | 16.8 | 15.7 | 1.07 | No lithium plating | 12.9 | 79.2% |

As can be seen from Table 5, the electrolyte in Examples 28 to 34 contained ethyl propionate in addition to fluoroethylene carbonate (FEC), ethyl acetate, and vinylene carbonate (VC), so that Examples 28 to 34 met the requirement (1) "$0.5<R_{ct}/R_{cp}<1.5$ and both $R_{ct}$ and $R_{cp}$ are less than 35 milliohms", the requirement (2) "$0.005 \leq A/B \leq 0.1$", the requirement (3) "$0.67 \leq X/A \leq 20$" and the requirement (5) "$0.001 \leq C/B \leq 0.03$", and further met the requirement (6) "$1 \leq D/C \leq 240$". Therefore, in the three tests of cycling, temperature rise and lithium plating, compared with Example 23 which met the requirements (1) to (3) and (5) but did not meet the requirement (6), Examples 28 to 34 obviously achieved better technical effects.

F. The Lithium-Ion Batteries of Examples 35 to 45 were Prepared According to the Above Method, and the Test Results were Shown in Table 6.

TABLE 6

| Example | X | A (g) | B (m²/g) | A/B | X/A | Compound of formula II Ethyl difluoroacetate (g) | Compound of formula III 1,1,2,2-tetrafluoroethyl-2,2,2-trifluoroethyl ether (g) |
|---|---|---|---|---|---|---|---|
| | | (g) | | | | | |
| Example 10 | Ethyl acetate | 0.093 | 0.0195 | 1.6 | 0.0122 | 4.77 | / | / |
| Example 35 | Ethyl acetate | 0.093 | 0.0195 | 1.6 | 0.0122 | 4.77 | 0.015 | / |
| Example 36 | Ethyl acetate | 0.093 | 0.0195 | 1.6 | 0.0122 | 4.77 | 0.037 | / |
| Example 37 | Ethyl acetate | 0.093 | 0.0195 | 1.6 | 0.0122 | 4.77 | 0.076 | / |
| Example 38 | Ethyl acetate | 0.093 | 0.0195 | 1.6 | 0.0122 | 4.77 | 0.098 | / |
| Example 39 | Ethyl acetate | 0.093 | 0.0195 | 1.6 | 0.0122 | 4.77 | 0.13 | / |
| Example 40 | Ethyl acetate | 0.093 | 0.0195 | 1.6 | 0.0122 | 4.77 | 0.15 | / |
| Example 41 | Ethyl acetate | 0.093 | 0.0195 | 1.6 | 0.0122 | 4.77 | / | 0.015 |
| Example 42 | Ethyl acetate | 0.093 | 0.0195 | 1.6 | 0.0122 | 4.77 | / | 0.022 |

TABLE 6-continued

| Example | | | | | | | | |
|---|---|---|---|---|---|---|---|---|
| Example 43 | Ethyl acetate | 0.093 | 0.0195 | 1.6 | 0.0122 | 4.77 | / | 0.036 |
| Example 44 | Ethyl acetate | 0.093 | 0.0195 | 1.6 | 0.0122 | 4.77 | / | 0.053 |
| Example 45 | Ethyl acetate | 0.093 | 0.0195 | 1.6 | 0.0122 | 4.77 | / | 0.065 |

| Example | $R_{ct}$ (milliohm) | $R_{cp}$ (milliohm) | $R_{ct}/R_{cp}$ | Whether lithium plating | Temperature rise during 8 C. charging (° C.) | Capacity retention rate after cycling at 45° C. |
|---|---|---|---|---|---|---|
| Example 10 | 22.5 | 23.1 | 0.97 | Slight lithium plating | 18.1 | 77.4% |
| Example 35 | 22.3 | 22.8 | 0.98 | Slight lithium plating | 17.9 | 77.90% |
| Example 36 | 22.2 | 22.6 | 0.98 | Slight lithium plating | 17.7 | 78.10% |
| Example 37 | 21.7 | 22.4 | 0.97 | Slight lithium plating | 17.6 | 78.90% |
| Example 38 | 21.9 | 22.1 | 0.99 | Slight lithium plating | 17.8 | 78.50% |
| Example 39 | 22.1 | 22.8 | 0.97 | Slight lithium plating | 17.8 | 77.90% |
| Example 40 | 22.4 | 22.9 | 0.98 | Slight lithium plating | 18 | 77.30% |
| Example 41 | 22.4 | 22.7 | 0.99 | Slight lithium plating | 17.8 | 78.10% |
| Example 42 | 22.1 | 22.5 | 0.98 | Slight lithium plating | 17.7 | 78.30% |
| Example 43 | 21.8 | 22.1 | 0.99 | Slight lithium plating | 17.5 | 78.80% |
| Example 44 | 21.5 | 21.7 | 0.99 | Slight Lithium plating | 17.9 | 78.90% |
| Example 45 | 22 | 21.9 | 1.00 | Slight lithium plating | 17.9 | 78.70% |

Note:
"/" indicates not added.

As can be seen from Table 6, in Examples 35 to 40, an appropriate amount of the compound of formula II (for example, ethyl difluoroacetate) was further added to the electrolyte containing a fluoroethylene carbonate (FEC) and the compound of formula I (for example, ethyl acetate); therefore, in the tests of cycling and temperature rise, Examples 35 to 40 achieved better technical effects than Example 10 in which the compound of formula II was not added.

In Examples 41 to 45, an appropriate amount of the compound of formula III (for example, 1,1,2,2-tetrafluoroethyl-2,2,2-trifluoroethyl ether) was added to the electrolyte containing a fluoroethylene carbonate (FEC) and the compound of formula I (for example, ethyl acetate); therefore, in the tests of cycling and temperature rise, Examples 41 to 45 achieved better technical effects than Example 10 in which the compound of formula III was not added.

The above are only a few embodiments of this application, and do not limit this application in any form. Although this application is disclosed as above with preferred embodiments, the embodiments are not intended to limit this application. Changes or modifications made by those skilled in the art using the technical content disclosed above without departing from the scope of the technical solution of this application are considered as equivalent embodiments and fall within the scope of the technical solution.

References to "some embodiments", "an embodiment", "another example", "examples", "specific examples", or "some examples" in the specification mean the inclusion of specific features, structures, materials, or characteristics described in the embodiment or example in at least one embodiment or example of this application. Accordingly, descriptions appearing in the specification, such as "in some embodiments", "in the embodiments", "in an embodiment", "in another example", "in an example", "in a particular example", or "for example", are not necessarily references to the same embodiments or examples in this application. In addition, specific features, structures, materials, or characteristics herein may be incorporated in any suitable manner into one or more embodiments or examples.

Although illustrative embodiments have been demonstrated and described, those skilled in the art should understand that the above embodiments are not to be construed as limiting this application, and that the embodiments may be changed, replaced, and modified without departing from the spirit, principle, and scope of this application.

What is claimed is:

1. An electrochemical apparatus, comprising:
an electrolyte, a positive electrode and a negative electrode;
wherein, the negative electrode comprises a negative active material layer, and the negative active material layer comprises a negative active material;
the electrolyte comprises fluoroethylene carbonate; and $0.5 < R_{ct}/R_{cp} < 1.5$, and both $R_{ct}$ and $R_{cp}$ are less than 35 milliohms, wherein Rot represents a charge transfer resistance under 50% state of charge at 25 degrees Celsius, and $R_{cp}$ represents a concentration polarization resistance in the 50% state of charge at 25 degrees Celsius; and $0.005 \leq A/B \leq 0.1$, wherein a mass of the fluoroethylene carbonate corresponding to 1 g of the negative active material is A g, and a specific surface area of the negative active material is B m²/g,
wherein the electrolyte contains a compound of formula I:

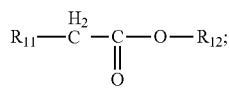

formula I wherein $R_{11}$ is selected from hydrogen, a hydroxy group, a $C_{1-20}$ alkyl group, a $C_{1-20}$ alkoxy group, a $C_{2-20}$ alkenyl group, a $C_{6-30}$ aryl group, or a $C_{6-30}$ aryloxy group;
$R_{12}$ is selected from hydrogen, a $C_{1-20}$ alkyl group, a $C_{2-20}$ alkenyl group, or a $C_{6-30}$ aryl group;
wherein a mass of the compound of formula I corresponding to 1 g of the negative active material is X g, and the value of X ranges from 0.035 to 0.39, and
wherein $0.67 \leq X/A \leq 20$.

2. The electrochemical apparatus according to claim 1, wherein the value of A ranges from 0.01 to 0.1, and the value of B ranges from 1.0 to 2.0.

3. The electrochemical apparatus according to claim 1, wherein the compound of formula I comprises at least one of the following compounds: methyl acetate, ethyl acetate, propyl acetate, methyl propionate, ethyl propionate, n-propyl propionate, isopropyl propionate, n-butyl propionate, isobutyl propionate, n-amyl propionate, isoamyl propionate, ethyl butyrate, n-propyl butyrate, propyl isobutyrate, n-pentyl butyrate, n-pentyl isobutyrate, n-butyl butyrate, isobutyl isobutyrate, or n-pentyl valerate.

4. The electrochemical apparatus according to claim 1, wherein $0.1 \leq X/P \leq 3$, wherein the value of P is a porosity of the negative active material layer and P ranges from 0.13 to 0.35.

5. The electrochemical apparatus according to claim 1, wherein the electrolyte further contains vinylene carbonate, a mass of the vinylene carbonate corresponding to 1 g of the negative active material is C g, and $0.001 \leq C/B \leq 0.03$.

6. The electrochemical apparatus according to claim 5, wherein the compound of formula I contains ethyl propionate, a mass of the ethyl propionate corresponding to 1 g of the negative active material is D g, and $1 \leq D/C \leq 240$.

7. The electrochemical apparatus according to claim 1, wherein the electrolyte further contains at least one of a compound of formula II or a compound of formula III:

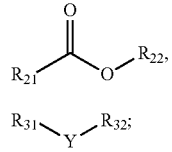

formula II formula III wherein $R_{21}$ and $R_{22}$ are each independently selected from a $C_{1-5}$ alkyl group that is unsubstituted or substituted with fluorine, and at least one of $R_{21}$ and $R_{22}$ contains fluorine;
$R_{31}$ and $R_{32}$ are each independently selected from a $C_{1-20}$ alkyl group that is unsubstituted or substituted with fluorine, at least one of $R_{31}$ and $R_{32}$ contains fluorine, and Y is selected from —O— or

8. The electrochemical apparatus according to claim 7, wherein a mass of the compound of formula II corresponding to 1 g of the negative active material is 0.015 g to 0.15 g.

9. The electrochemical apparatus according to claim 7, wherein a mass of the compound of formula III corresponding to 1 g of the negative active material is 0.015 g to 0.065 g.

10. The electrochemical apparatus according to claim 7, wherein
the compound of formula II comprises at least one of the following compounds: methyl difluoroacetate, ethyl difluoroacetate, propyl difluoroacetate, methyl difluoropropionate, ethyl difluoropropionate, propyl difluoropropionate, methyl fluoroacetate, ethyl fluoroacetate, propyl fluoroacetate, methyl trifluoroacetate, ethyl trifluoroacetate, or propyl trifluoroacetate; and
the compound of formula III comprises at least one of the following compounds: 1,1,2,2-tetrafluoroethyl-2,2,2-trifluoroethyl ether, or perfluoro(2-methyl-3-pentanone).

11. An electronic apparatus, comprising an electrochemical apparatus, wherein the electrochemical apparatus comprising an electrolyte, a positive electrode and a negative electrode, the negative electrode comprises a negative active material layer, the negative active material layer comprises a negative active material, the electrolyte comprises fluoroethylene carbonate, and, $0.5 < R_{ct}/R_{cp} < 1.5$, and both $R_{ct}$ and $R_{cp}$ are less than 35 milliohms, wherein $R_{ct}$ represents a charge transfer resistance under 50% state of charge at 25 degrees Celsius, and $R_{cp}$ represents a concentration polarization resistance in the 50% state of charge at 25 degrees Celsius; and $0.005 \leq A/B \leq 0.1$, wherein a mass of the fluoroethylene carbonate corresponding to 1 g of the negative active material is A g, and a specific surface area of the negative active material is B m²/g, wherein the electrolyte contains a compound of formula I:

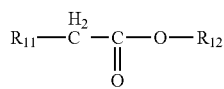

formula I wherein $R_{11}$ is selected from hydrogen, a hydroxy group, a $C_{1-20}$ alkyl group, a $C_{1-20}$ alkoxy group, a $C_{2-20}$ alkenyl group, a $C_{6-30}$ aryl group, or a $C_{6-30}$ aryloxy group;

$R_{12}$ is selected from hydrogen, a $C_{1-20}$ alkyl group, a $C_{2-20}$ alkenyl group, or a $C_{6-30}$ aryl group;

wherein a mass of the compound of formula I corresponding to 1 g of the negative active material is X g, and the value of X ranges from 0.035 to 0.39, and wherein $0.67 \leq X/A \leq 20$.

12. The electronic apparatus according to claim 11, wherein the value of A ranges from 0.01 to 0.1, and the value of B ranges from 1.0 to 2.0.

13. The electronic apparatus according to claim 11, wherein the compound of formula I comprises at least one of the following compounds: methyl acetate, ethyl acetate, propyl acetate, methyl propionate, ethyl propionate, n-propyl propionate, isopropyl propionate, n-butyl propionate, isobutyl propionate, n-amyl propionate, isoamyl propionate, ethyl butyrate, n-propyl butyrate, propyl isobutyrate, n-pentyl butyrate, n-pentyl isobutyrate, n-butyl butyrate, isobutyl isobutyrate, or n-pentyl valerate.

14. The electronic apparatus according to claim 11, wherein $0.1 \leq X/P \leq 3$, wherein the value of P is a porosity of the negative active material layer.

15. The electronic apparatus according to claim 14, wherein P ranges from 0.13 to 0.35.

16. The electronic apparatus according to claim 11, wherein the electrolyte further contains vinylene carbonate, a mass of the vinylene carbonate corresponding to 1 g of the negative active material is C g, and $0.001 \leq C/B \leq 0.03$.

* * * * *